Oct. 25, 1927.　　　　　　　　　　　　　　1,646,610
P. G. BURDINE
AUTOMOBILE SEAT CONSTRUCTION
Filed Feb. 4, 1925　　　　2 Sheets-Sheet 1

Inventor
Pearl G. Burdine.

By

Attorney

Oct. 25, 1927.  
P. G. BURDINE  
AUTOMOBILE SEAT CONSTRUCTION  
Filed Feb. 4, 1925
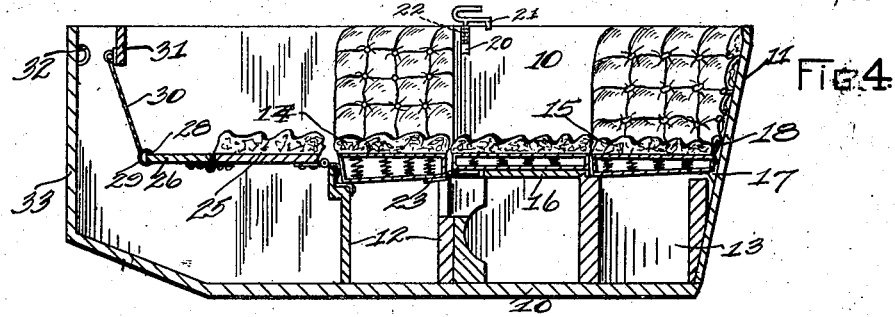
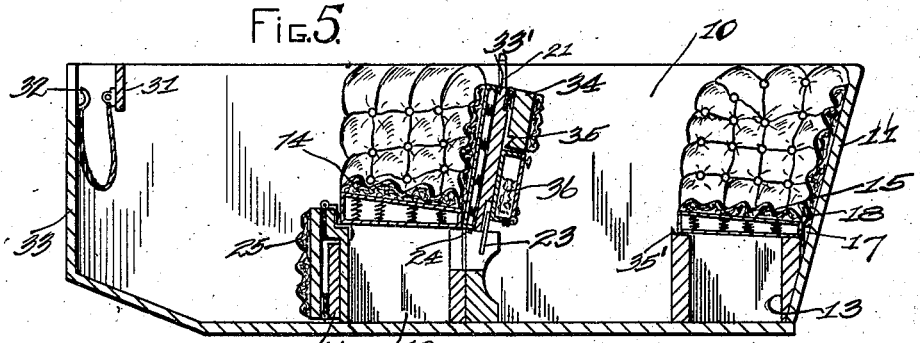
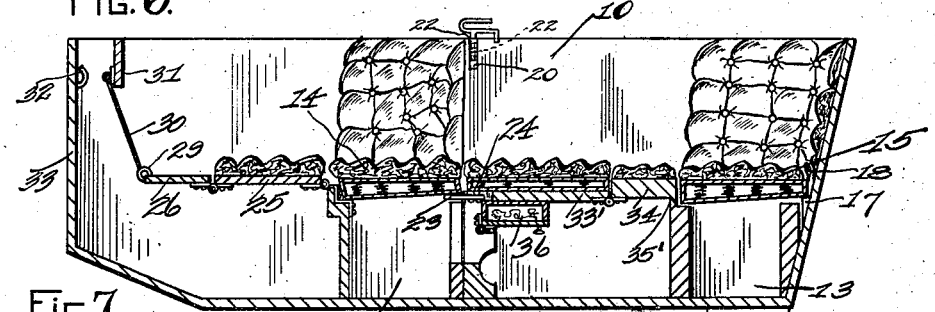
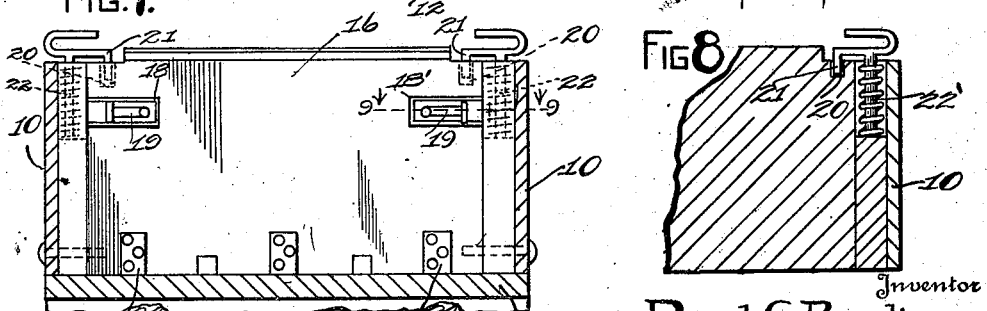
Inventor  
Pearl G. Burdine.  
Attorney Patented Oct. 25, 1927.

1,646,610

UNITED STATES PATENT OFFICE.

PEARL G. BURDINE, OF CHESTER, MISSISSIPPI.

AUTOMOBILE SEAT CONSTRUCTION.

Application filed February 4, 1925. Serial No. 6,792.

This invention relates to new and useful improvements in automobiles, and particularly to seat constructions therefor.

The principal object of the invention is to so construct and arrange the parts of the seats of an automobile that such parts may be moved into position to form a bed.

Another object is to provide an automobile seat construction which, when in normal position, has the appearance of the ordinary seats, but which may be quickly and easily manipulated into position to provide a strong, and level bed structure, of approximately the entire length of the automobile.

Another object resides in the particular novel construction and arrangement of the various parts which permit the ready and quick conversion from seats to bed, and vice versa.

Other objects and advantages will be apparent from the following description when taken in connection with the accompanying drawings.

In the drawings:

Figure 4 is a vertical longitudinal sectional view on the line 4—4 of Figure 2.

Figure 5 is a sectional view similar to Figure 3, showing a modified form of back for the front seat, which is particularly adapted for automobiles of large size.

Figure 6 is a sectional view similar to Figure 4, showing the form of seat back shown in Figure 5.

Figure 7 is a vertical transverse sectional view on the line 7—7 of Figure 1, showing the construction of the back of the front seat.

Figure 8 is an enlarged vertical sectional view on the line 8—8 of Figure 1.

Figure 9 is an enlarged horizontal sectional view on the line 9—9 of Figure 7.

Figure 1:
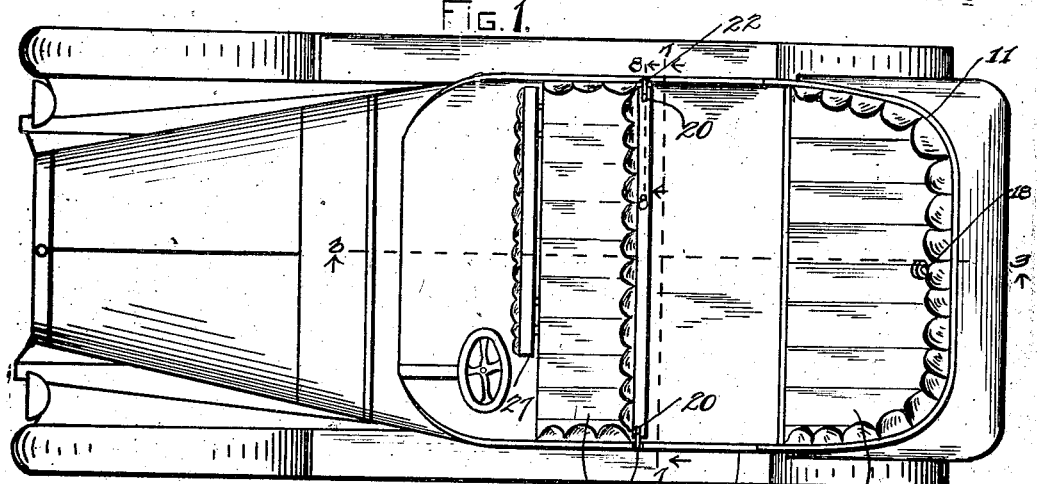
Figure 1 is a top plan view of an automobile body, showing the seats in normal condition, the top of the automobile being removed.
Figure 2:
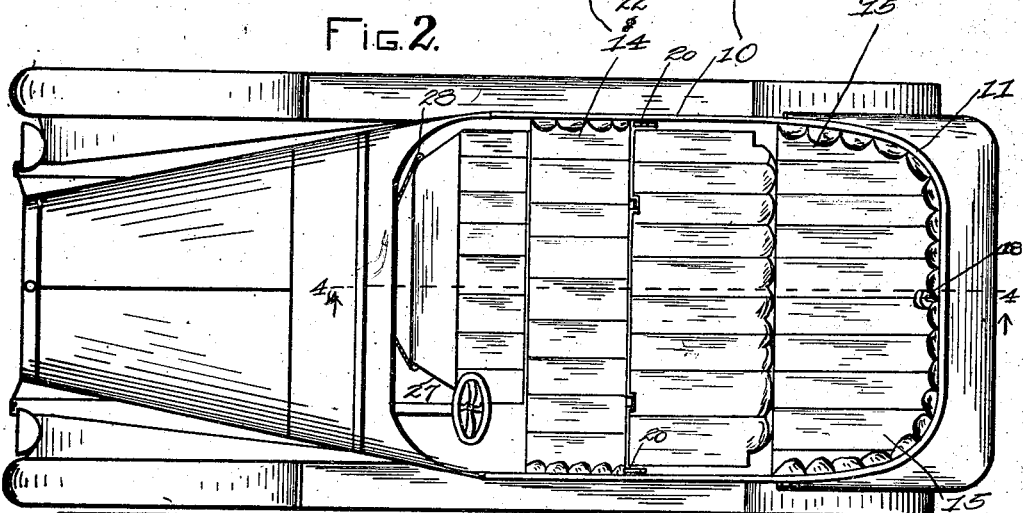
Figure 2 is a similar view showing the seats converted into a bed.
Figure 3:
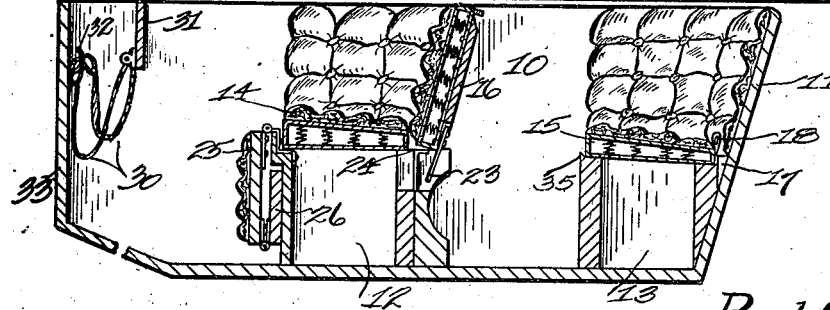
Figure 3 is a vertical longitudinal sectional view on the line 3—3 of Figure 1.

Referring particularly to the accompanying drawings, there is shown an automobile body which includes the sides 10, the rear wall 11, and the front and rear seat boxes 12 and 13, respectively. Disposed on the boxes 12 and 13, respectively, are the seat cushion members 14 and 15, said cushions inclining downwardly and rearwardly, in the usual manner. The back member 16, of the front seat, is hinged to the rear of the front seat box 12, whereby to permit downwardly and rearwardly swinging movement, to engage on the front portion of the rear seat box 13, just in advance of the front edge portion of the rear seat cushion 15. Mounted on the inner face of the rear wall of the body of the automobile are the vertically disposed members 17, the upper ends of which are in approximately the same plane as the upper edge of the front of the rear box 13, whereby to support the rear of the said cushion 15 in a level position. A suitable handle loop 18 is carried by the rear of the cushion 15 to permit lifting the cushion onto the upper ends of the members or supports 17. In the side walls of the body of the automobile, in line with the back member of the front seat, are formed the vertical grooves 18, which receive the slidable spring pressed bolts 19, carried by the said back member, and which serve to hold the back member from accidental backward movement. In the side portions of the upper edge of the back member 16 there are formed the recesses 20 for the reception of the downwardly extending portions 21, of the vertically movable, spring pressed locking members 22, said members serving as an additional means for holding the member 16 against accidental backward movement. Carried by the lower edge of the back member 16 are the downwardly extending fingers 23, which, when the back member is lowered to provide the bed, engage beneath the rear edge of the front cushion member 14, and lift the same so that the entire cushion member is on the same level as the back member 16, and the rear cushion member 15. Additional supporting elements 24 are carried by the rear of the front box 12 for engagement with the said edge of the front cushion member, for the support of the latter.

Hinged to the front of the front box 12 is a transversely extending member 25, and hinged to the forward edge of this member is a second smaller member 26, these members being arranged to be elevated into the plane of the bed, and to form the foot portion thereof. The portion 26 is slightly shorter than the portion 25, and the end of the member 25, at the side of the automobile occupied by the driver, is cut off obliquely, as shown at 27. On each end of the member 26 there is disposed an outwardly extending lug or pin 28, which is arranged to be engaged by the ring 29, carried by the cord 30, which is secured to the lower edge of the instrument board 31, for supporting the members 25 and 26 in a horizontal position, when the seat members have been adjusted into bed forming position. A hook 32, on the dashboard 33, is provided for receiving these rings 29, when the members 25 and 26 are folded downwardly against the front of the front seat box 12, to permit the ordinary use of the seat.

From an inspection of Figures 1 and 4, it will readily be seen that the seats of the automobile may be quickly converted into a level bed, which extends practically the entire length of the automobile. Furthermore, the portions of the seats may be readily and quickly restored to their normal condition, whereby the automobile assumes an appearance which does not differ from the ordinary automobile, not so equipped.

The above described construction applies to the smaller types of automobiles, but when used in larger types of automobiles, there is a greater distance between the front and rear seats, thereby requiring a longer back for the front seat, whereby to reach the rear seat. In this event the form of back member for the front seat as shown in Figures 5 and 6, is adopted, such back member 33' having an extension 34, hinged to the upper edge thereof, and arranged to engage with the front edge of the rear seat box 13. The outer longer edge of the extension is formed with a longitudinal groove 35 which receives the lip 35 on said edge of the box 13. The member 33' is also formed with a box 36 for gloves, tools, or the like.

What is claimed is:

The combination with the front and rear seat boxes and the seat cushions of an automobile, the upper forward edge of the rear seat box having a longitudinal lip, of a back for the front seat hinged to the seat box thereof and arranged to be lowered to the level of the said rear box, a hinged extension on the upper portion of said seat back having a longitudinal groove receiving said lip therein whereby to hold said seat back in proper position, the lower edge of the said back having projections arranged to engage beneath the rear edge of the front cushion to elevate the latter into horizontal position, a foldable extension cushion on the front of the front box, and a flexible support for the last-named extension.

In testimony whereof, I affix my signature.

PEARL G. BURDINE.